United States Patent
Obcena et al.

(10) Patent No.: US 12,335,544 B2
(45) Date of Patent: Jun. 17, 2025

(54) PLAYBACK DEVICE INTEGRATION

(71) Applicant: SPOTIFY AB, Stockholm (SE)

(72) Inventors: Mark Obcena, Solna (SE); Vladimir Ivankov, Stockholm (SE); Celso Santa Rosa Filho, Stockholm (SE); Adnan Waheed, Stockholm (SE); Erik Broberg, Stockholm (SE); Laura Elizabeth Knill, Stockholm (SE)

(73) Assignee: Spotify AB, Stockholm (SE)

( * ) Notice: Subject to any disclaimer, the term of this patent is extended or adjusted under 35 U.S.C. 154(b) by 30 days.

(21) Appl. No.: 17/359,130

(22) Filed: Jun. 25, 2021

(65) Prior Publication Data

US 2022/0337889 A1  Oct. 20, 2022

Related U.S. Application Data

(60) Provisional application No. 63/176,116, filed on Apr. 16, 2021.

(51) Int. Cl.
*H04N 21/2381* (2011.01)
(52) U.S. Cl.
CPC .............................. *H04N 21/2381* (2013.01)
(58) Field of Classification Search
CPC ........... H04N 21/2381; H04N 65/4076; H04N 65/4092; H04N 65/105; H04N 65/605
See application file for complete search history.

(56) References Cited

U.S. PATENT DOCUMENTS

| 9,583,140 | B1 |   | 2/2017 | Rady |   |
|---|---|---|---|---|---|
| 10,536,741 | B1 | * | 1/2020 | Madison | H04N 21/8456 |
| 11,392,291 | B2 | * | 7/2022 | Carrigan | H04M 1/72442 |
| 2014/0108497 | A1 | * | 4/2014 | Yao | H04N 21/2387 709/203 |
| 2014/0125703 | A1 | * | 5/2014 | Roveta | H04N 21/4788 345/633 |

(Continued)

FOREIGN PATENT DOCUMENTS

| CN | 107113459 | A | * | 8/2017 | ........... H04N 21/235 |
| FR | 3068554 | B1 | * | 7/2020 | ............. G06F 3/165 |
| MY | 179188 | A | * | 10/2020 | ........... G06F 3/0346 |

*Primary Examiner* — Ricky Chin
(74) *Attorney, Agent, or Firm* — McDonnell Boehnen Hulbert & Berghoff LLP

(57) ABSTRACT

A method of integrating a playback device for use with a backend server of a media streaming platform includes the following steps: providing an application programming interface (API) command processor at a server to send and receive network communication with a cloud playback adapted system; receiving at the API command processor, from a cloud playback client associated with the cloud playback adapted system, a status of the cloud playback adapted system; receiving at the API command processor, from the cloud playback client, a playback command to control playback of a media content item; and sending a message from the API command processor to the cloud playback client in response to the playback command, the message including an identification of the media content item to permit the cloud playback adapted system to retrieve the media content item for playback of the media content item by the cloud playback adapted system.

20 Claims, 9 Drawing Sheets

(56) References Cited

U.S. PATENT DOCUMENTS

| | | | |
|---|---|---|---|
| 2015/0032851 A1* | 1/2015 | Lieber | H04L 65/762 |
| | | | 709/219 |
| 2015/0245106 A1* | 8/2015 | Tian | H04N 21/4302 |
| | | | 725/40 |
| 2015/0358381 A1* | 12/2015 | Coburn, IV | H04L 65/60 |
| | | | 700/94 |
| 2017/0063956 A1* | 3/2017 | Rajapakse | H04L 65/612 |
| 2018/0081968 A1* | 3/2018 | Aryan | G06F 16/638 |
| 2019/0158353 A1 | 5/2019 | Johnson et al. | |
| 2019/0222877 A1* | 7/2019 | Liao | H04N 21/6437 |
| 2019/0304507 A1 | 10/2019 | Leyfman et al. | |
| 2019/0394588 A1* | 12/2019 | Goldstein | H04N 21/44227 |
| 2020/0076939 A1* | 3/2020 | Lambourne | H04W 4/20 |
| 2020/0128056 A1* | 4/2020 | Simotas | H04L 67/2814 |
| 2020/0162536 A1* | 5/2020 | Vincent | H04L 65/611 |
| 2020/0169610 A1* | 5/2020 | Wang | H04W 4/60 |
| 2022/0182732 A1* | 6/2022 | Brockmann | H04N 21/47217 |
| 2022/0337889 A1* | 10/2022 | Obcena | H04N 21/8456 |

\* cited by examiner

PLAYBACK DEVICE INTEGRATION

CROSS-REFERENCE TO RELATED APPLICATION(S)

This application claims the benefit of U.S. Application No. 63/176,116, filed on Apr. 16, 2021, which application is incorporated herein by reference in its entirety.

BACKGROUND

In order for a playback device, such as a smart speaker, to connect to a media streaming service, the playback device must be custom designed and programmed in order to communicate with the media streaming service. But many devices do not have sufficient hardware capabilities to implement all necessary playback-related functionality on those devices themselves. Additionally, sometimes complex logic is required to be installed on the playback device, making it complicated and difficult for the product developer to enable the device to function with the media streaming service.

SUMMARY

In general terms, this disclosure is directed to playback device integration. In some embodiments, and by non-limiting examples, a playback device is configured to communicate with a backend server of a media streaming platform such that the backend server can control playback at the playback device.

One aspect can include a method of integrating a playback device for use with a backend server of a media streaming platform. The method includes the following steps: providing an application programming interface (API) command processor at a server to send and receive network communication with a cloud playback adapted system; receiving at the API command processor, from a cloud playback client associated with the cloud playback adapted system, a status of the cloud playback adapted system; receiving at the API command processor, from the cloud playback client, a playback command to control playback of a media content item; and sending a message from the API command processor to the cloud playback client in response to the playback command, the message including an identification of the media content item to permit the cloud playback adapted system to retrieve the media content item for playback of the media content item by the cloud playback adapted system.

Another aspect can include at least one computer readable storage device storing data instructions that, when executed by at least one server including at least one processor, cause the at least one server to: provide an application programming interface (API) command processor at a server to send and receive network communication with a cloud playback adapted system; receive at the API command processor, from a cloud playback client associated with the cloud playback adapted system, a status of the cloud playback adapted system; receive at the API command processor, from the cloud playback client, a playback command to control playback of a media content; and send a message from the API command processor to the cloud playback client in response to the playback command, the message including an identification of the media content item to permit the cloud playback adapted system to retrieve the media content item for playback of the media content item by the cloud playback adapted system.

DETAILED DESCRIPTION

Figure 1:
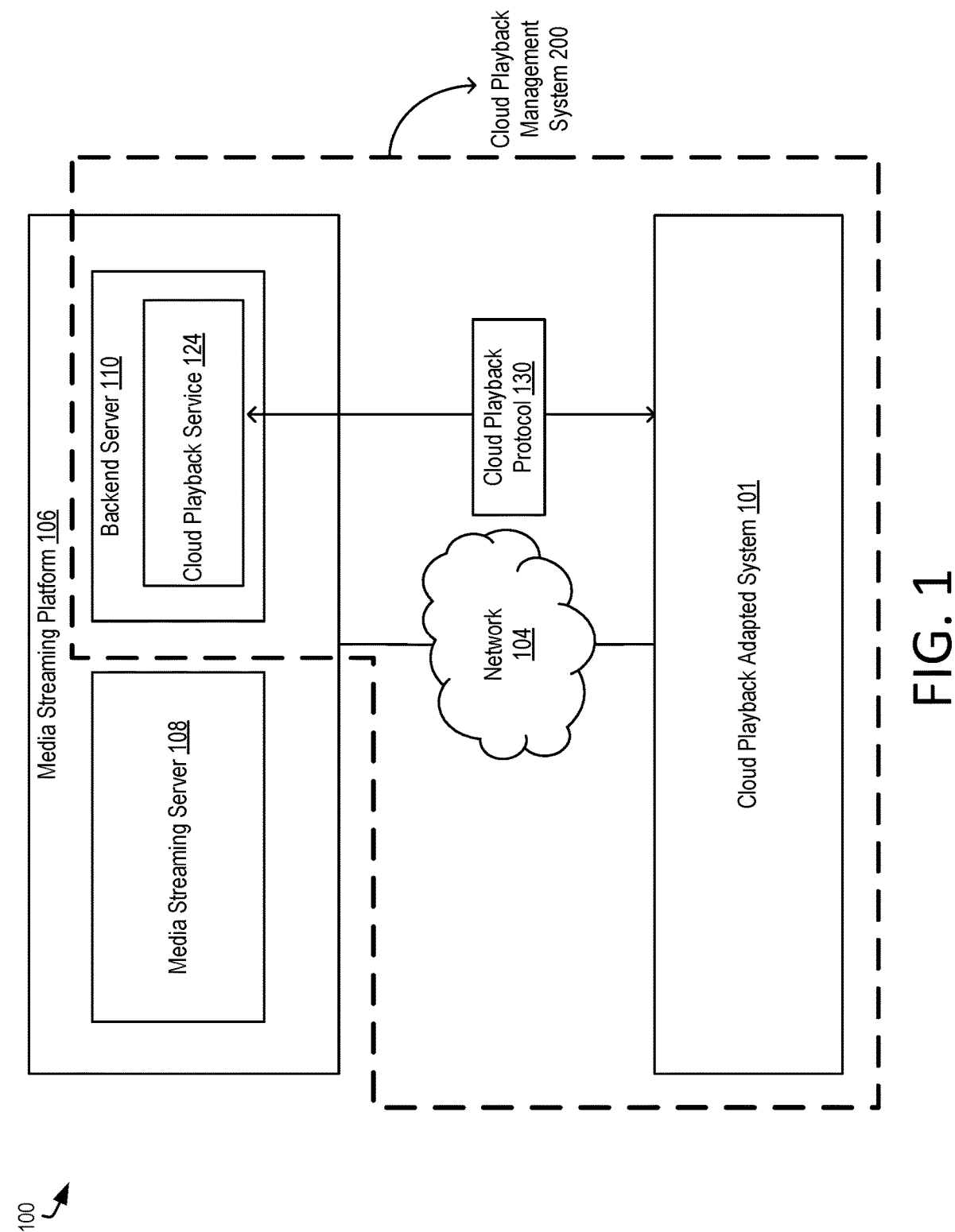
FIG. 1 is a diagram illustrating an example architecture having a cloud playback management system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

This disclosure addresses problems of the prior art by providing an efficient way to transform a playback device to be enabled for playback from a media streaming platform. In an example configuration, at least some of the logic that would otherwise be required in a playback device is shifted to a backend server of an media streaming platform. As such, various commands and events can be processed at the backend server rather than on the playback device, making the integration process simplified and generally applicable to different architectures.

FIG. 1 is a diagram illustrating an example architecture 100 having a cloud playback management system 200. As shown in FIG. 1, the architecture 100 includes a media streaming platform 106 and a cloud playback adapted system 101. The media streaming platform 106 communicates with the cloud playback adapted system 101 via a network 104. The media streaming platform 106 includes, among other things, a media streaming server 108 and the backend server 110. In some implementations, the backend server 110 may be located at the same location as the media streaming server 108. In other implementations, the backend server 110 and the media streaming server 108 may be located at different locations.

The media streaming server 108 provides media streaming services to various users. The backend server 110 includes a cloud playback service 124 and provides functions to enable the cloud playback adapted system 101 to be controlled by the backend server 110 for a cloud playback session. Details of the backend server 110 will be described below with reference to FIGS. 2 and 8.

The cloud playback adapted system 101 is a playback device that has been adapted for a cloud playback session. In other words, the cloud playback adapted system 101, which previously was not capable of conducting a cloud playback session, has been enabled for playback from the media streaming platform 106. The cloud playback adapted system 101 communicates with the cloud playback service 124 via a cloud playback protocol 130 specified by the media streaming platform 106. The cloud playback adapted system 101 may exchange playback statuses, playback commands, and messages with the cloud playback service 124, which will be described in detail below with reference to FIGS. 3-7. As such, a cloud playback management system 200 in the dashed block in FIG. 1 is achieved. The cloud playback management system 200 includes, among other things, the backend server 110 and the cloud playback adapted system 101. The cloud playback adapted system 101 can access the media streaming server 108 for media content items to be played thereon.

In some embodiments, the cloud playback adapted system 101 may be a playback device, and the playback device is capable of communicating with the cloud playback service 124 via the cloud playback protocol 130 specified by the media streaming platform 106. Such embodiments are referred to as direct integration embodiments, details of which will be described below with reference to FIGS. 2-7.

In other embodiments, the cloud playback adapted system 101 may include a playback device, which is not capable of communicating with the cloud playback service 124 via the cloud playback protocol 130 specified by the media streaming platform 106. The playback device can only communicate via an external protocol, which is typically specified by the manufacturer of the playback device, different from the cloud playback protocol 130. As a result, the cloud playback adapted system 101 may further include a proxy backend server 136 that may translate the cloud playback protocol 130 to the external protocol. As such, the playback device can communicate with the cloud playback service 124 with the help of the proxy backend server serving as an intermediary. From the perspective of the backend server 110, it communicates with the cloud playback adapted system 101, i.e., the playback device and the proxy backend server as a whole, via the cloud playback protocol 130. Such embodiments are referred to as external protocol integration embodiments, details of which will be described below with reference to FIG. 8.

In some embodiments, the media content items played at the cloud playback adapted system 101 are provided by the media streaming server 108 and transmitted to the cloud playback adapted system 101 using the network 104. A media content item is an item of media content, including audio, video, or other types of media content, which may be stored in any format suitable for storing media content. Non-limiting examples of media content items include songs, albums, music videos, movies, television episodes, podcasts, other types of audio or video content, and portions or combinations thereof.

Figure 4:
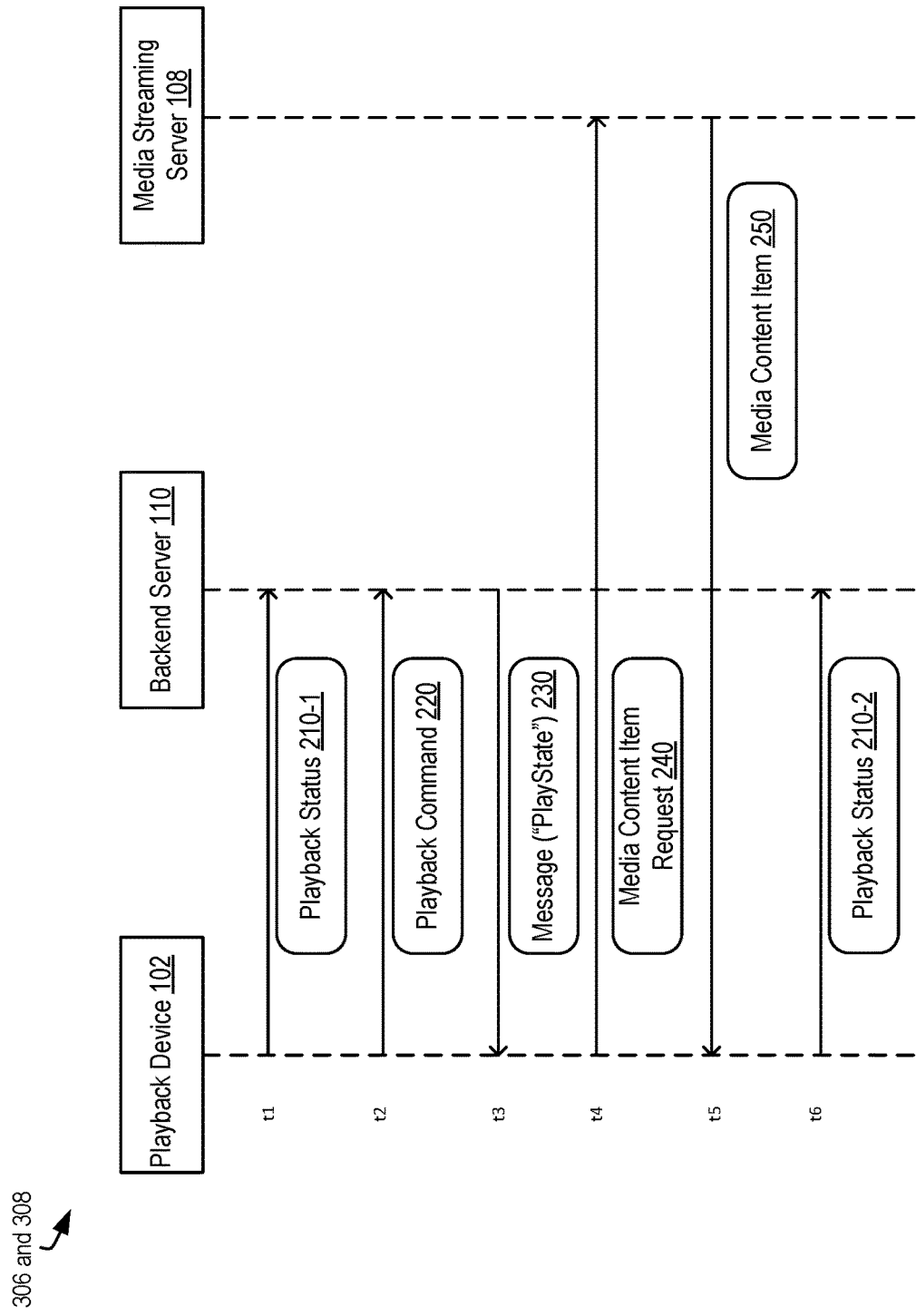
FIG. 4 is a diagram illustrating an example of two operations of FIG. 3.

The media streaming server 108 may include one or more computing devices and may operate to provide media content items to the playback devices 102 and, in some embodiments, other playback devices as well. The media streaming server 108 may operate to transmit media content items to playback devices such as the playback device 102. In some embodiments, the media streaming server 108 may include, among other things, a media server application, a processing device, a memory device, and a network access device. The media server application may include a media device interface, a media data store, and a media streaming service. The media streaming service operates to buffer media content items for streaming to one or more streams. An example interaction between the media streaming server 108 and the cloud playback adapted system 101 (e.g., a playback device in the direct integration embodiments as shown in FIG. 4) will be described below with reference to FIG. 4.

The network 104 is an electronic communication network that facilitates communication between two or more components of the architecture 100. In some embodiments, the network 104 is a local area network, peer-to-peer connection, wireless or cellular network, or other forms of network.

Figure 2:
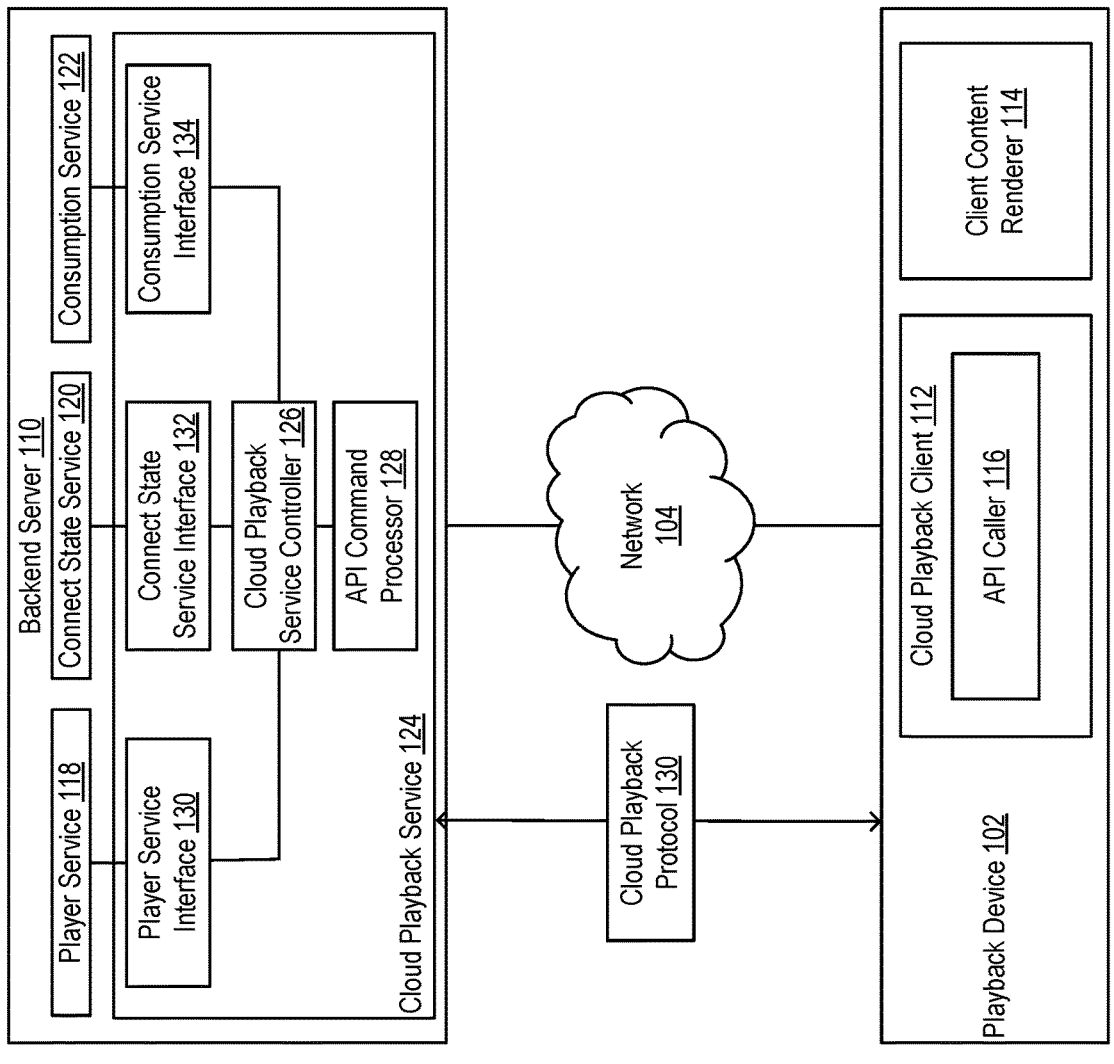
FIG. 2 is a diagram illustrating an example cloud playback management system.

FIG. 2 is a diagram illustrating an example cloud playback management system 200*a*. In FIG. 2, the cloud playback management system 200*a* includes the backend server 110 and the playback device 102. In other words, the cloud playback management system 200*a* is an embodiment of direct integration. The playback device 102 communicates with the backend server 110 via the network 104.

The playback device 102 operates to play media content items to produce media output. In the example in FIG. 2, the playback device 102 may include a cloud playback client 112 and a client content renderer 114. The cloud playback client 112 operates to communicate with the cloud playback service 124 of the backend server 110 via the cloud playback protocol 130. In some implementations, the client content renderer 114 may prepare decompressed data stored in a decompressed buffer to be presented on an output device. In some implementations, the client content renderer 142 may store decompressed stream data in a display buffer or frame buffer prior to sending the data to a presentation device. In some implementations, the output device then transfers the rendered data to a device for presenting the media data. In some implementations, the output device itself is a display or audio presentation device and presents the media data directly (e.g., a display or speakers). The client content renderer 114 may be software, hardware, or a combination thereof.

The backend server 110 provides functions to enable the playback device 102 to be controlled by the backend server 110 for a cloud playback session. In this example in FIG. 2, the backend server 110 may include, among other things, the cloud playback service 124, the player service 118, the connect state service 120, and the consumption service 122. In this example in FIG. 2, the cloud playback service 124 may include, among other things, a cloud playback service controller 126, an application programming interface (API) command processor 128, a player service interface 130, a connect state service interface 132, and a consumption service interface 134. It should be noted that the backend server 110 may include other components, such as a processor, a memory device, and the like.

The player service 118 is configured to provide information on what to play. The player service 118 can be used, for example, to recommend a song track or a playlist to various users. In a non-limiting example, the recommendation may be based on a specific user's listening history (e.g., the specific user's taste profile) and/or the listening history of other users with similar tastes. In another non-limiting example, the recommendation may be based on a specific user's activity (e.g., workout, study, and the like).

The connect state service 120 is configured to provide information on user accounts, corresponding playback devices, and corresponding playback statuses, and the like. As such, the backend server 110 knows which users it is dealing with by way of knowing user accounts, which playback devices it is dealing with by way of knowing corresponding playback devices, and what playback statuses it is dealing with by way of knowing corresponding playback statuses. In some implementations, the connect state service 120 may enable certain devices to control playback sessions of other playback devices, as shown in the example in FIG. 9, which will be described in detail below. For instance, the backend server 110 may know, using the connect state service 120, that a user's account is "user12345" and he or she is listening to a song track called "song #1" on his or her playback device called "playback device #2." In some implementations, the backend server 110 can, through the connect state service 120, receive timely updates about what is being played on other playback devices (e.g., playback devices other than the "playback device #2" in the previous example), and in some cases can also control what is being played on the other playback devices.

The consumption service 122 is configured to provide information on how much a media content item has been played on a given playback device, which may be used as, in some examples, a portion of the listening history of the specific user. In a non-limiting example, the consumption service 122 may know that "song #1" has been played for 45 seconds on "playback device #2" that is associated with "user12345." The listening history of a specific user can be used, for example, by the player service 118, for recommending media content items that may possibly fit the specific user's taste profile.

The player service interface 130, the connect state service interface 132, and the consumption service interface 134 operate to interface with the player service 118, the connect state service 120, and the consumption service 122, respectively. Information such as information on the playback device 102, its associated user accounts, and media content item that is currently being played, and so on, is exchanged between the cloud playback service 124 and the player service 118, the connect state service 120, and the consumption service 122, respectively.

The cloud playback service controller 126 operates to control various functions of the cloud playback service 124. In one non-limiting example, the cloud playback service controller 126 may include a processor and an internal memory, and the processor may run programs stored in the internal memory. The internal memory in this example serves as a storage cache for temporarily storing data when the program is run.

The API command processor 128 operates to take requests (also referred to as API calls) generated by the API caller 116 at the cloud playback client 112 of the playback device 102. The API command processor 128 then processes the requests and sends the processing results back to the cloud playback client 112 via the network 104. The API caller 116, on the other hand, operates to make API calls to the backend server 110 through the API command processor 128. In one implementation, an API communication channel (e.g., a push channel) is set up, and the cloud playback client 112 is able to handle commands (e.g., push commands) received from the cloud playback service 124.

In summary, the cloud playback service 124 at the backend server 110 and the cloud playback client 122 at the playback device 102 facilitate all necessary communication and signaling to allow the backend server 110 to control the playback at the playback device 102 in a cloud playback session. The cloud playback client 112 "talks" to the cloud playback service 124 to get information on what to play as well as to send its playback statuses and/or commands to the backend server 110.

Figure 3:
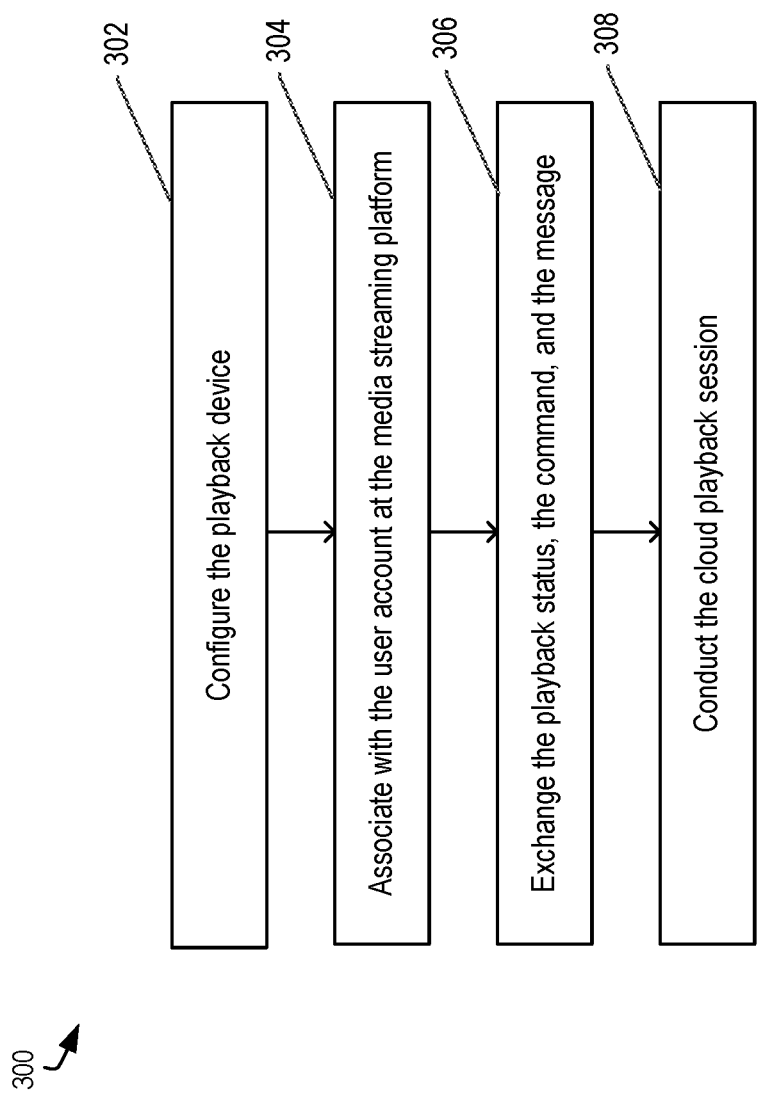
FIG. 3 is a flowchart diagram illustrating an example flow.

FIG. 3 is a flowchart diagram illustrating an example flow 300. In this example, the flow 300 includes operations 302, 304, 306, and 308. FIG. 4 is a diagram illustrating an example of the operation 306 and the operation 308 of FIG. 3.

At the operation 302, the playback device 102 is configured. During the configuration, the cloud playback client 112 of the playback device 102 communicates with the cloud playback service 124 of the backend server 110 via the network 104. In one implementation, the cloud playback service 124 creates and saves a new client instance configuration for the playback device 102. The cloud playback protocol 130 is also set up during the configuration. Upon the configuration, the cloud playback client 112 and the cloud playback service 124 can communicate with each other via the cloud playback protocol 130. The cloud playback client 112 may inform the cloud playback service 124 that the playback device 102 is online and may request one or more media content items to play. The cloud playback client 112 may also inform the cloud playback service 124 of any relevant information. In one example, the information on the playback device 102, for example, the name, the IP address, the type, and the device description, is sent to the backend server 110.

At the operation 304, the playback device 102 is associated with the user account at the media streaming platform 106. In one implementation, a window may pop up, and the user of the playback device 102 may be asked to provide login information of the media streaming platform 106. Upon the input of the login information, the playback device 102 is associated with the user account at the media streaming platform 106. As such, the connect state service 120 may update the entry related to the user account by adding the information (e.g., the name, the IP address, the type, and the descriptor of the playback device 102) on the playback device 102 to the database.

At the operation 306, the cloud playback client 112 and the cloud playback service 124 exchange playback statuses, commands, and messages. At the operation 308, the cloud playback session is conducted. As mentioned above, an example of the operation 306 and the operation 308 are illustrated in FIG. 4.

In the example of FIG. 4, the playback device 102 sends a playback status 210-1 to the backend server 110 at the moment t1. The playback status 210-1 includes information on the current playback state of the playback device 102. In some implementations, the playback status 210-1 may include at least one of the following information: (1) a notification that the playback of an media content item is done; (2) a notification that a new media content item is ready for playback; (3) a notification that the playback is paused; (4) a notification of a playback failure; (5) a notification that the playback is in progress; (6) a notification that the playback is resumed; (6) a notification that the playback position is changed. It should be noted that the playback status 210-1 may also include other information as needed. In one example, the playback status 210-1 includes the identification of the media content item currently being played and the playback position of the media content item. In another example, the playback status 210-1 may include the identification of the media content item currently being played, the state of pause, and the playback position where the media content item pauses.

In the example of FIG. 4, at the moment t2, the playback device 102 sends a playback command 220 to the backend server 110. Playback commands are requests, from the cloud playback client 112 to the cloud playback service 124, for something. In one example, the playback command 220 is for playing a media content item (i.e., a "play" command).

In one example, the playback command 220 is for skipping to the next media content track (i.e., a "skip next" command). In another example, the playback command 220 is for skipping to the previous media content track (i.e., a "skip previous" command). In another example, the playback command 220 is for switching on the shuffle mode (i.e., a "shuffle on" command). In yet another example, the playback command 220 is for enabling repeating one media content item (i.e., a "repeat one" command). In another example, the playback command 220 is for seeking a specific media content item (i.e., a "seek" command). In yet another example, the playback command 220 is for requesting the current playable media content item (i.e., a "get current" command). A current playable media content item may expire and in such situation the playback device 102 will need to refresh the current playable media content item. In another example, the playback command 220 is for requesting to get the next playable media content item in the current context (i.e., a "get next" command). It should be noted that other commands related to playback control are within the scope of the disclosure.

Figure 5:
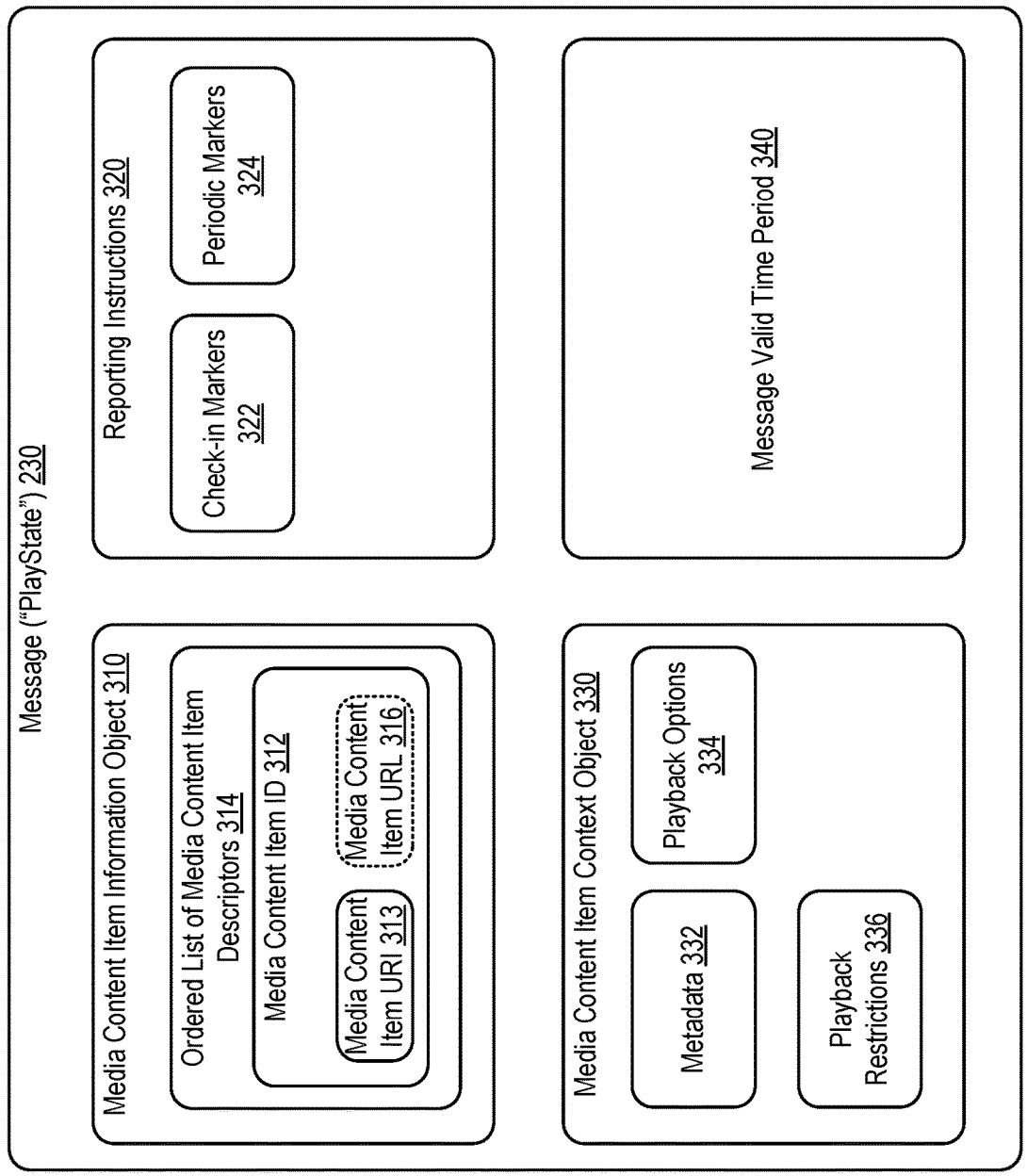
FIG. 5 is a diagram illustrating an example of the message.

In the example of FIG. 4, after receiving the playback status 210-1 and the playback command 220, the backend server 110 sends a message (also referred to as a "Play State message") to the playback device 102 at the moment t3. The message 230 is an object that holds, among other things, information on the media content item to be played by the playback device 102 according to the playback command 220. FIG. 5 is a diagram illustrating an example of the message 230.

In the example of FIG. 5, the message 230 includes, among other things, a media content item information object 310, a media content item context object 330, reporting instructions 320, and a message valid time period 340. It should be noted that the example of message 230 in FIG. 5 is one example, and other structures and components are within the scope of the disclosure.

The media content item information object 310 includes information on the media content item to be played by the playback device 102. In one example, the playback command 220 sent to the backend server 110 is a "skip next" command as mentioned above, so the media content item information object 310 includes information on the following media content item, for example, in a queue generated by the player service 118.

In the example of FIG. 5, the media content item information object 310 includes an ordered list of media content item descriptors 314. In the example of FIG. 5, the ordered list of media content item descriptors 314 includes a media content item ID 312. In some implementations, the media content item ID 312 includes a Uniform Resource Identifier (URI). In some implementations, the media content item ID 312 includes a Uniform Resource Locator (URL). Upon having the media content item ID 312, the playback device 102 may request the corresponding media content item from the media streaming server 108, as will be shown below. In some embodiments, the media content item URL 316 can optionally be provided to the playback device 102. Likewise, the playback device 102 may request the corresponding media content item from the media streaming server 108 upon having the media content item URL 316. The media content item descriptor 314 may include information on the media content item such as different supported formats (e.g., a MPEG-4 Part 14 (MP4) format) and/or bitrates (e.g., 128 Kbps, 256 Kbps, etc.).

The media content item context object 330 includes information on the context of the media content item. In the example of FIG. 5, the media content item context object 330 includes, among other things, metadata 332, playback options 334, and playback restrictions. The metadata 332 are metadata for the current media content item and metadata for the previous media content item or the next media content item in the context, if available. Metadata is data about a media content item (i.e., data about data). In a non-limiting example, the metadata 332 is a collection of the artist name, the producer, the writer, the title, the release date, the genre, and the duration of a song track. The playback options 334 may include information on playback options such as whether shuffle mode is on, whether repeat mode is on, and so on.

The playback restrictions 336 may include information on restrictions on playback. In one example, the playback restrictions 336 may include the restriction on the "skip next" command when a certain number of "skip next" commands have been executed in a predetermined time period. In another example, the playback restrictions 336 may include the restriction on the "skip previous" command when there is no previous media content item (i.e., the media content item currently being played is the first one). It should be noted that other information may be included in the media content item context object 330.

The reporting instructions 320 are instructions on when the playback device 102 should send playback statuses (e.g., the playback statuses 210-1 and 210-2 in FIG. 4, collectively 210) to the backend server 110. It is important for the backend server 110 to know the playback statuses of the playback device 102. By way of specifying the reporting instructions 320, the backend server 110 can keep updated of the playback statuses at the playback device 102. This enables the backend server 110 to control the cloud playback session at the playback device 102. In the example of FIG. 5, the reporting instructions 320 are not included in the media content item information object 310. In other implementations, however, the reporting instructions 320 are included in the media content item information object 310, serving as a property of the media content item information object 310.

In the example of FIG. 5, the reporting instructions 320 include both check-in markers 322 and periodic markers 324. The check-in markers 322 are scheduled time points when the cloud playback client 112 of the playback device 102 is allowed to send the playback statuses 210 to the backend server 110. The periodic markers 324 are scheduled periodic time points when the cloud playback client 112 of the playback device 102 is allowed to send the playback statuses 210 to the backend server 110.

Figure 7:
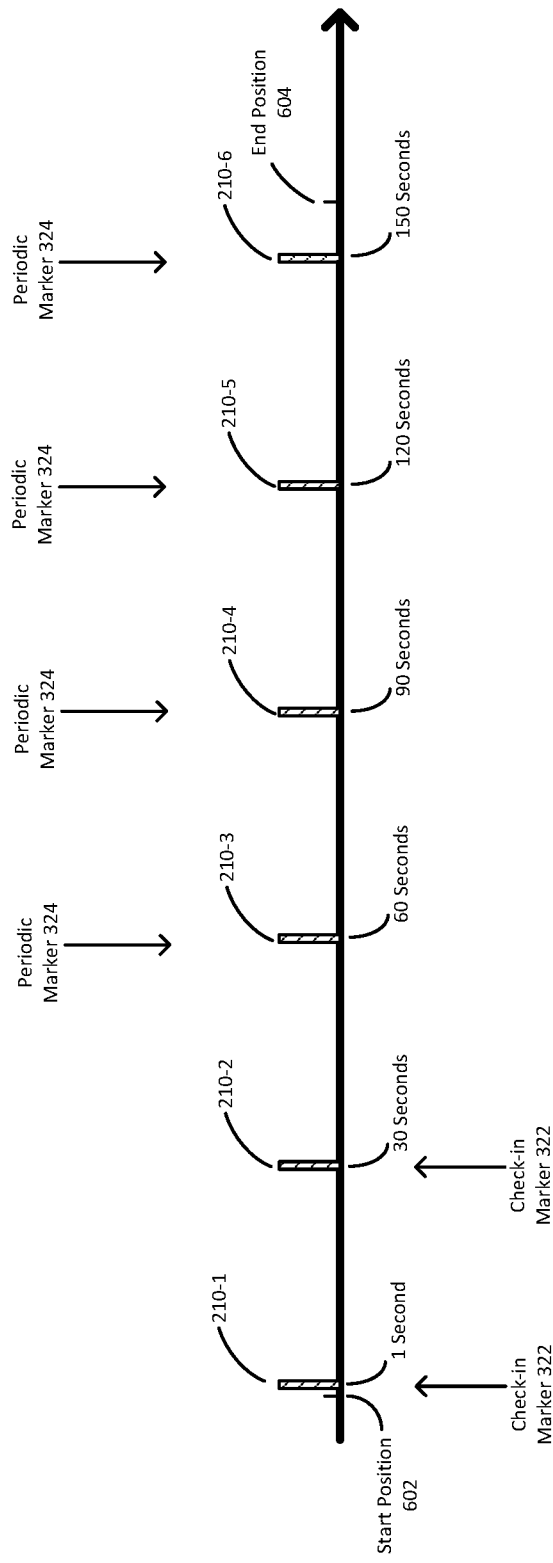
FIG. 7 is a diagram illustrating the reporting instructions of FIG. 5.

FIG. 7 is a diagram illustrating the reporting instructions 320 of FIG. 5. In the example of FIG. 7, a media content item has a start position 602 and an end position 604. It should be noted that, in some cases, a media content item doesn't necessarily have an end position. Two check-in markers 322 are located at 1 second and 30 seconds, respectively, measured from the start position 602. The playback statuses 210-1 and 210-2 corresponding to the two check-in markers 322 are sent. The one-second check-in marker 322 is for determining whether the media content item is actually played, which is important for the backend server 110 to know.

On the other hand, the thirty-second check-in marker 322 is for determining whether at least that portion of the media content item has been played. As explained above, the fact that 30 seconds of the media content item has been played may be used as, in some examples, a portion of the listening history of the specific user. The listening history of a specific user can be used, for example, by the player service 118, for recommending media content items that may possibly fit the specific user's taste profile.

In the example of FIG. 7, four periodic markers 324 are located at 60 seconds, 90 seconds, 120 seconds, and 150 seconds, respectively. In other words, the backend server 110 specifies, by sending the message 230 of FIG. 4, which includes the reporting instructions 320, that the playback device 102 should send playback statuses every 30 seconds. The periodic markers 324 are scheduled after the check-in markers 322 (e.g., 30 seconds after the second check-in marker 322 in the example of FIG. 7). The playback statuses 210-3, 210-4, 210-5, and 210-6 corresponding to periodic markers 324 are sent. With the help of the periodic markers 324, the backend server 110 can have a good knowledge of the playback statuses of the playback device 102 during the duration of the media content item. It should be noted that other configurations of the check-in markers 322 and the periodic markers 324 are within the scope of the disclosure.

Referring back to FIG. 5, the message valid time period 340 sets up a lifespan of the message 230. In other words, the message 230 expires (i.e., no longer valid) after the message valid time period 340. In one example, the value for the message valid time period 340 may use Unix timestamp in milliseconds (e.g., 1629459200, which corresponds to 08/20/2021, at 11:33 am (UTC)).

Figure 6:
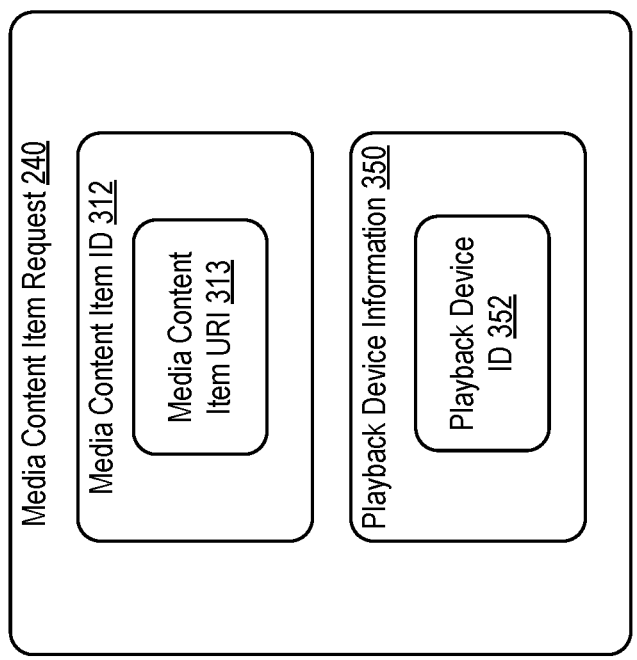
FIG. 6 is a diagram illustrating an example of the media content item request.

Referring back to FIG. 4, after the playback device 102 receives the message 230, the playback device 102 knows the media content item information object 310 as shown in FIG. 5. As a result, at the moment t4, the playback device 102 may send a media content item request 240 to the media streaming server 108. In some implementations, the media content item request 240 is a Hypertext Transfer Protocol Secure (HTTPS) request to the media streaming server 108. FIG. 6 is a diagram illustrating an example of the media content item request 240.

In the example of FIG. 6, the media content item request 240 includes, among other things, the media content item ID 312 and a playback device information 350. In some implementations, the media content item ID 312 includes the media content item URI 313, which is included in the message 230 received from the backend server 110.

In the example of FIG. 6, the playback device information 350 includes a playback device ID 352. The playback device ID 352 included in the playback device information 350 provides the media streaming server 108 with better knowledge of the playback device 102. In some implementations, the media streaming server 108 may customize media content items delivered to the playback device 102 based on the playback device ID 352 included in the playback device information 350. It should be noted that, in other implementations, the playback device information 350 may include other information.

Referring back to FIG. 4, after receiving the media content item request 240, the media streaming server 108 delivers the media content item 250 to the playback device 102 at the moment t5. In some implementations, the delivery is based on the media content item ID 312 and/or the media content item URL 316. As explained above, the delivery may also be customized based on the playback device information 350 in other implementations. As such, a cloud playback session has been conducted, and the playback device 102 is controlled by the backend server 110.

At the moment t6, the playback device 102 may send another playback status 210-2, for example, at 30 seconds measured from the start position 602, as shown in FIG. 7. The operations 306 and 308 may continue for the next cycle.

Figure 8:
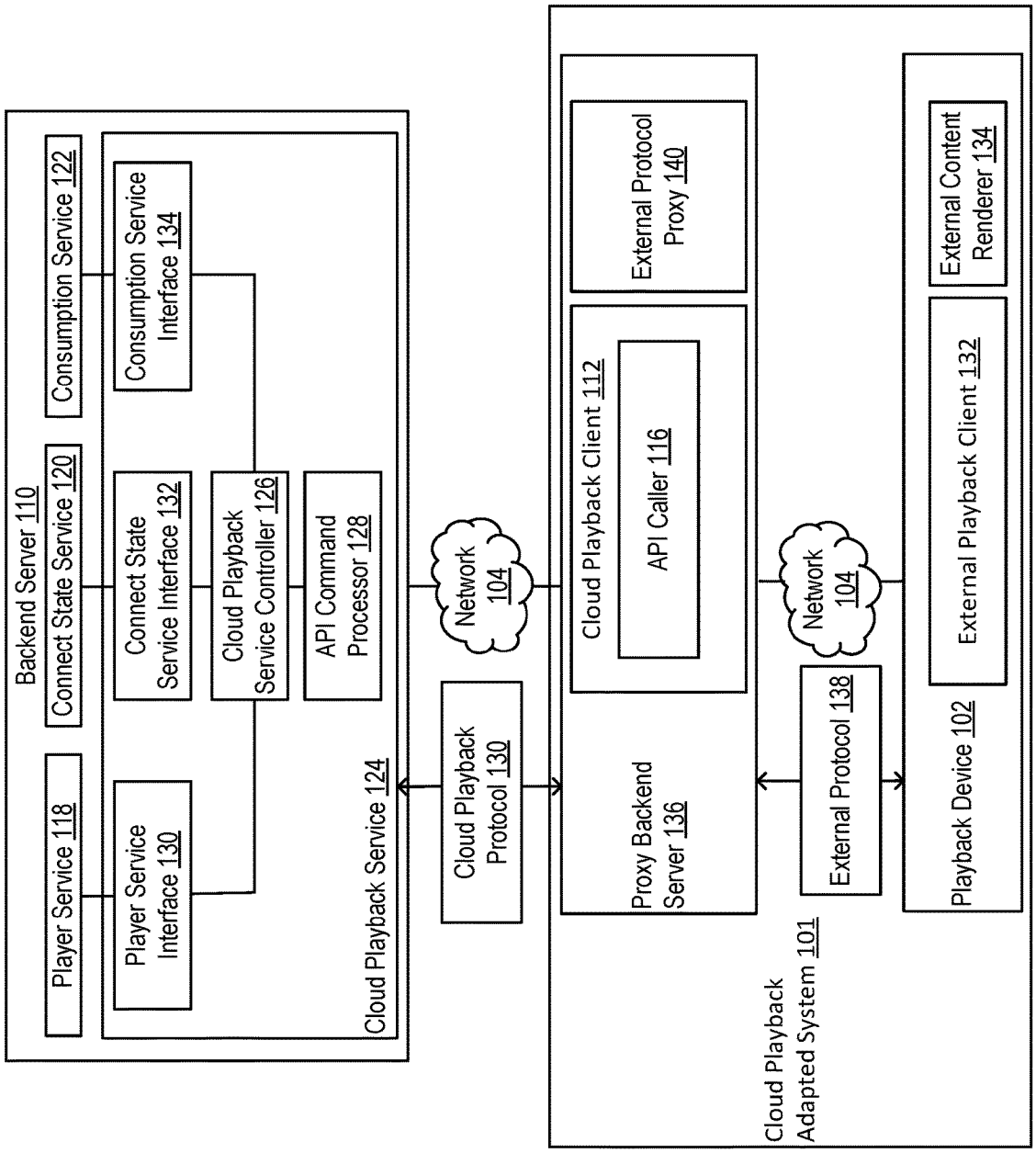
FIG. 8 is a diagram illustrating another example cloud playback management system.

FIG. 8 is a diagram illustrating another example cloud playback management system 200*b*. As mentioned above, in the example of FIG. 8, the cloud playback adapted system 101 may include a playback device 102, which is not capable of communicating with the cloud playback service 124 via the cloud playback protocol 130 specified by the media streaming platform 106. The playback device 102 can only communicate via an external protocol, which is typically specified by the manufacturer of the playback device 102, different from the cloud playback protocol 130. Therefore, in the example of FIG. 8, the cloud playback adapted system 101 further includes a proxy backend server 136 that operates to translate the cloud playback protocol 130 to the external protocol 138. As such, the playback device 102 can communicate with the cloud playback service 124 with the help of the proxy backend server 136 serving as an intermediary. From the perspective of the backend server 110, it communicates with the cloud playback adapted system 101 via the cloud playback protocol 130, which is similar to the situation of FIG. 2.

For simplicity, details of similar or identical components of the backend server 110 and the cloud playback adapted system 101 are not repeated. The proxy backend 136 acts as a retrofit module to translate the cloud playback protocol 130 to the external protocol 138. The proxy backend 136 includes, among other things, the cloud playback client 112 and an external protocol proxy 140. The cloud playback client 112 is the same as that of FIG. 2 and includes the API caller 116.

The external protocol proxy 140 operates to translate the cloud playback protocol 130 to the external protocol 138. Once translated, the cloud playback client 112 can communicate with the external playback client 132 at the playback device 102 via the external protocol 138. On the other hand, the cloud playback client 112 can communicate with the external playback client 132 of the playback device 102 via the external protocol 138. As such, from the perspective of the playback device 102, the playback device 102 is still interfacing with the outside world (i.e., the backend server 110 and the proxy backend server 136 in the example of FIG. 8) using its own protocol, namely the external protocol 138.

It should be noted that the proxy backend server 136 is not necessarily located in close proximity to the playback device 102. In one example, the proxy backend server 136 is located in close proximity to the backend server 110. In another example, the proxy backend server 136 and the backend server 110 are both located in proximity to the media streaming server 108.

Figure 9:
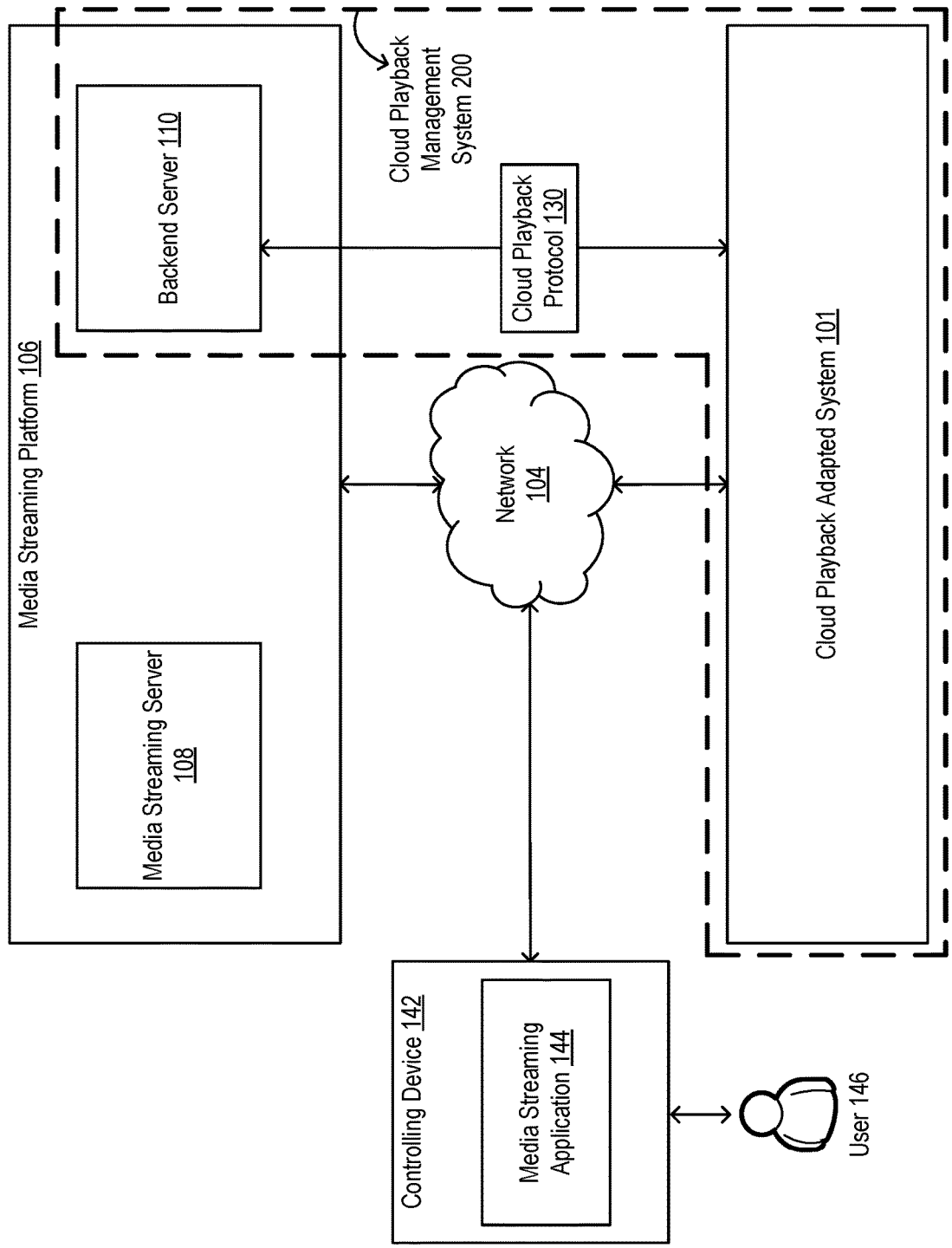
FIG. 9 is a diagram illustrating an alternative configuration including a controlling device.

FIG. 9 is a diagram illustrating an alternative configuration including a controlling device 142. In the example of FIG. 9, a user 146 is allowed to control the cloud playback adapted system 101 using his or her controlling device 142 as a remote. The controlling device 142 includes, among other things, a media streaming application 144 installed on it, and the media streaming application 144 is corresponding to the media streaming platform 106. In one implementation, once both the controlling device 142 and the playback device 102 are connected to the same network (e.g., a Wi-Fi network), the user 146 can use the controlling device 142 as a remote to control the cloud playback adapted system 101. Other than that, the cloud playback management system 200 functions similarly as described with reference to FIG. 1.

Embodiments of the present disclosure may be conveniently implemented using one or more conventional general purpose or specialized digital computer, computing device, machine, or microprocessor, including one or more processors, memory and/or computer-readable storage media programmed according to the teachings of the present disclosure. Appropriate software coding can readily be prepared by skilled programmers based on the teachings of the present disclosure, as will be apparent to those skilled in the software art.

In some embodiments, the present disclosure includes a computer program product which is a non-transitory storage medium or computer-readable medium (media) having instructions stored thereon/in which can be used to program a computer to perform any of the processes of the present disclosure. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present disclosure has been provided for the purposes of illustration and description. It is not intended to be exhaustive or limited to the precise forms disclosed. Many modifications and variations will be apparent to the practitioner skilled in the art.

The various embodiments described above are provided by way of illustration only and should not be construed to limit the claims attached hereto. Those skilled in the art will readily recognize various modifications and changes that may be made without following the example embodiments and applications illustrated and described herein.

Additional Clauses

The following are additional clauses relative to the present disclosure, which could be combined and/or otherwise integrated with any of the embodiments described above or listed in the claims below.

Clause 1. A system comprising:
a playback device including:
a cloud playback client configured to communicate with a cloud playback application programming interface (API) via a cloud playback protocol; and
a client content renderer configured to play media content; and
a backend server including the cloud playback API configured to communicate with the cloud playback client to:
receive, from the cloud playback client, an event reporting a playback status of the playback device;
receive, from the cloud playback client, a playback command to control playback of media content; and
send a message to the cloud playback client in response to the playback command, the message including an identification (ID) of a media content item to permit the playback device to play the media content item according to the playback command.

Clause 2. The system of Clause 1 further comprising:
a streaming service database accessible to the playback device and the backend server, wherein the playback device is configured to access the media content item based on the ID of the media content item.

Clause 3. The system of Clause 1, wherein the message further includes reporting instructions specifying a scheduled time for the cloud playback client to send the playback status to the cloud playback API.

Clause 4. The system of Clause 3, wherein the reporting instructions include check-in markers and periodic markers (e.g., every 15 seconds).

Clause 5. The system of Clause 4, wherein the check-in markers are scheduled at one second and thirty seconds from a starting point of the media content item.

Clause 6. A method of integrating a playback device for use with a backend server of a media streaming platform, the method comprising:
providing an application programming interface (API) command processor at a server to send and receive network communication with the playback device;
receiving at the API command processor, from a cloud playback client associated with the playback device, an event, the event reporting a status of the playback device;
updating a state of the playback device with the server based on the reported status;
receiving at the API command processor, from the cloud playback client, a playback command to control playback of media content; and
sending a message from the API command processor to the cloud playback client in response to the playback command, the message including an identification of a media content item to permit the cloud playback client to retrieve the media content item according to the playback command for playback of the media content item by the playback device.

Clause 7. At least one computer readable storage device storing data instructions that, when executed by at least one server including at least one processor, cause the at least one server to:
provide an application programming interface (API) command processor at a server to send and receive network communication with the playback device;
receive at the API command processor, from a cloud playback client associated with the playback device, an event, the event reporting a status of the playback device;
update a state of the playback device with the server based on the reported status;
receive at the API command processor, from the cloud playback client, a playback command to control playback of media content; and
send a message from the API command processor to the cloud playback client in response to the playback command, the message including an identification of a media content item to permit the cloud playback client to retrieve the media content item according to the playback command for playback of the media content item by the playback device.

Clause 8. A playback device comprising:
at least one processor;
at least one memory storage device, the memory storage device storing data instructions that, when executed by the at least one processor, cause the playback device to:
execute a cloud playback client that communicates with a server using an application programming interface using a predefined data communication protocol; and
execute a client content renderer configured to play media content from the playback device.

Clause 9. The playback device of Clause 8, wherein the instructions further cause the playback device to:
regularly send, using the application programming interface, an event message to the server, the event message reporting a playback status of the playback device.

Clause 10. The playback device of Clause 8, wherein the instructions further cause the playback device to:
send, using the application programming interface, a playback command to the server to adjust playback of media content; and
receive from the server a playback message including an identification of a media content item.

Clause 11. The playback device of Clause 10, further comprising:
sending the identification of the media content item to a media streaming server;
receiving the media content item from the media streaming server; and
playing the media content item.

Clause 12. A server comprising:
at least one processor;
at least one memory storage device, the memory storage device storing data instructions that, when executed by the at least one processor, cause the playback device to:
provide an application programming interface (API) command processor at a server to send and receive network communication with the playback device;
receive at the API command processor, from a cloud playback client associated with the playback device, an event, the event reporting a status of the playback device;
update a state of the playback device with the server based on the reported status;
receive at the API command processor, from the cloud playback client, a playback command to control playback of media content; and
send a message from the API command processor to the cloud playback client in response to the playback command, the message including an identification of a media content item to permit the cloud playback client to retrieve the media content item according to the playback command for playback of the media content item by the playback device.

Clause 13. A system comprising:
a proxy backend server including:
a cloud playback client configured to communicate with a cloud playback application programming interface (API) via a cloud playback protocol; and
an external protocol proxy configured to translate the cloud playback protocol to an external protocol;
a playback device including:
an external playback client configured to communicate with the cloud playback client via the external protocol; and
a client content renderer configured to play media content; and
a backend server including the cloud playback API configured to communicate with the cloud playback client to:
receive, from the cloud playback client, an event reporting a playback status of the playback device;
receive, from the cloud playback client, a playback command to control playback of media content; and
send a message to the cloud playback client in response to the playback command, the message including an identification (ID) of a media content item to permit the playback device to play the media content item according to the playback command.

Clause 14. The proxy backend server according to Clause 13.
Clause 15. The backend server according to Clause 13.
Clause 16. The playback device according to Clause 13.

What is claimed is:

1. A method of integrating a playback device for use with a backend server of a media streaming platform, the method comprising:
providing an application programming interface (API) command processor at a server to send and receive communication over a network with a cloud playback adapted system;
receiving at the API command processor, from a cloud playback client associated with the cloud playback adapted system, a status of the cloud playback adapted system, the status including a media playback state of the cloud playback adapted system, the media playback state including information about a current media content item being played at the cloud playback adapted system;
receiving at the API command processor, from the cloud playback client, a playback command to control playback of a media content item;
updating by the server the media playback state according to the playback command received from the cloud playback client; and
sending a message from the API command processor to the cloud playback client in response to the playback command, the message defining the updated media playback state including an identification of the media content item to permit the cloud playback adapted system to retrieve the media content item for playback of the media content item by the cloud playback adapted system, wherein the message further comprises reporting instructions specifying a scheduled time for the cloud playback client to send further information about the status to the API command processor, wherein the reporting instructions include a first check-in marker and a second check-in marker, wherein the first check-in marker represents a time at which the cloud playback client is to send a first message indicating whether the media content item is played, and wherein the second check-in marker represents a time at which the cloud playback client is to send a second message indicating whether at least a predefined portion of the media content item has been played.

2. The method of claim 1, wherein the cloud playback adapted system is a playback device.

3. The method of claim 2, wherein the server communicates with the cloud playback client via a cloud playback protocol.

4. The method of claim 1, wherein the cloud playback adapted system comprises:
a playback device configured to communicate via an external protocol; and
a proxy backend server comprising the cloud playback client and an external protocol proxy, wherein the server communicates with the cloud playback client via a cloud playback protocol, and wherein the external protocol proxy is configured to translate the cloud playback protocol to the external protocol.

5. The method of claim 1, further comprising:
updating the media playback state of the cloud playback adapted system with the server based on the status of the cloud playback adapted system.

6. The method of claim 1, further comprising:
sending a media content item request to a media streaming server, the media content item request comprising the identification of the media content item; and
retrieving the media content item from the media streaming server.

7. The method of claim 1, wherein the first check-in marker is located at 1 second when measured from a start position and the second check-in marker is located at 30 seconds when measured from the start position.

8. The method of claim 1, wherein the reporting instructions comprise periodic markers.

9. The method of claim 1, wherein the reporting instructions comprise a check-in marker at a specified time.

10. The method of claim 8, wherein the periodic markers are scheduled periodic time points when the cloud playback client is allowed to send playback statuses to the server.

11. The method of claim 8, wherein the periodic markers comprise four periodic markers.

12. The method of claim 1, wherein the status includes a playback position of the current media content item.

13. The method of claim 1, wherein the status includes a notification that the playback is paused and a playback position indicating where the current media content item was paused.

14. The method of claim 1, wherein the status includes at least one of:
   (a) a notification that the playback of the current media content item is done;
   (b) a notification that a new media content item is ready for playback;
   (c) a notification that the playback is paused;
   (d) a notification of a playback failure;
   (e) a notification that the playback is in progress;
   (f) a notification that the playback is resumed;
   (g) a notification that a playback position is changed; or
   (h) any combination of (a), (b), (c), (d), (e), (f), and (g).

15. At least one computer readable storage device storing data instructions that, when executed by at least one server including at least one processor, cause the at least one server to:
   provide an application programming interface (API) command processor at a server to send and receive communication over a network with a cloud playback adapted system;
   receive at the API command processor, from a cloud playback client associated with the cloud playback adapted system, a status of the cloud playback adapted system, the status including a media playback state of the cloud playback adapted system, the media playback state including information about a current media content item being played at the cloud playback adapted system;
   receive at the API command processor, from the cloud playback client, a playback command to control playback of a media content item;
   update by the server the media playback state according to the playback command received from the cloud playback client; and
   send a message from the API command processor to the cloud playback client in response to the playback command, the message defining the updated media playback state including an identification of the media content item to permit the cloud playback adapted system to retrieve the media content item for playback of the media content item by the cloud playback adapted system, wherein the message further comprises reporting instructions specifying a scheduled time for the cloud playback client to send further information about the status to the API command processor, wherein the reporting instructions include a first check-in marker and a second check-in marker, wherein the first check-in marker represents a time at which the cloud playback client is to send a first message indicating whether the media content item is played, and wherein the second check-in marker represents a time at which the cloud playback client is to send a second message indicating whether at least a predefined portion of the media content item has been played.

16. The at least one computer readable storage device of claim 15, wherein the cloud playback adapted system is a playback device.

17. The at least one computer readable storage device of claim 16, wherein the server communicates with the cloud playback client via a cloud playback protocol.

18. The at least one computer readable storage device of claim 15, wherein the cloud playback adapted system comprises:
   a playback device configured to communicate via an external protocol; and
   a proxy backend server comprising the cloud playback client and an external protocol proxy, wherein the server communicates with the cloud playback client via a cloud playback protocol, and wherein the external protocol proxy is configured to translate the cloud playback protocol to the external protocol.

19. The at least one computer readable storage device of claim 15, wherein the data instructions, when executed by the at least one server including the at least one processor, cause the at least one server to:
   update the media playback state of the cloud playback adapted system with the server based on the status of the cloud playback adapted system.

20. The at least one computer readable storage device of claim 15, wherein the message further comprises reporting instructions specifying a scheduled time for the cloud playback client to send the status to the API command processor.

* * * * *